US008280870B2

(12) United States Patent
Melet et al.

(10) Patent No.: US 8,280,870 B2
(45) Date of Patent: Oct. 2, 2012

(54) SEARCH ENGINE AND ASSOCIATED METHOD

(75) Inventors: Pierre-Etienne Melet, Biot (FR); Thierry Dufresne, Opio (FR); Cëdric Dourthe, Nice (FR); Marc Patoureaux, Grasse (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 291 days.

(21) Appl. No.: 12/713,149

(22) Filed: Feb. 25, 2010

(65) Prior Publication Data
US 2011/0167051 A1 Jul. 7, 2011

(30) Foreign Application Priority Data

Jan. 6, 2010 (EP) .................................... 10305016

(51) Int. Cl.
G06F 17/30 (2006.01)
G06Q 99/00 (2006.01)
(52) U.S. Cl. ........................ 707/706; 705/7.35; 705/400
(58) Field of Classification Search .................. 707/602, 707/706, 999.003; 705/7.13, 7.14, 7.16, 705/14.27, 14.31, 7.35, 400
See application file for complete search history.

(56) References Cited

U.S. PATENT DOCUMENTS

| | | | |
|---|---|---|---|
| 5,598,477 A * | 1/1997 | Berson ............................. 380/51 |
| 5,644,721 A * | 7/1997 | Chung et al. ...................... 705/6 |
| 6,119,094 A | 9/2000 | Lynch et al. |
| 6,839,679 B1 * | 1/2005 | Lynch et al. ...................... 705/5 |
| 7,363,242 B2 * | 4/2008 | Lewis et al. ........................ 705/5 |
| 7,587,390 B2 * | 9/2009 | Schmitz et al. ....................... 1/1 |
| 7,769,610 B2 * | 8/2010 | Liew et al. .......................... 705/5 |
| 7,970,671 B2 * | 6/2011 | Hahn-Carlson et al. .......... 705/35 |

(Continued)

OTHER PUBLICATIONS

Notification of Transmittal of the International Search Report and the Written Opinion of the International Searching Authority, or the Declaration for International Application No. PCT/EP2010/066038 (Dec. 3, 2010).

(Continued)

Primary Examiner — Cheryl Lewis
(74) Attorney, Agent, or Firm — Wood, Herron & Evans, LLP

(57) ABSTRACT

A method of searching for a entity amongst a plurality of entities, wherein all the entities are linked by at least one criterion in common and have a plurality of data formats, wherein each entity comprises a set of data which can be searched by means of criteria entered by a user; and wherein each entity has a data format; and further wherein a specific one of the data formats defines a standard record format; the method comprising the steps of: determining the data format of an entity; if the data format of the entity does not match the standard record format, passing the entity to a pre-processing engine; if the data format of the entity does match the standard record format, passing standard record format data of the entity to a main processing engine; in the pre-processing engine comparing the entity data format to the standard record format and applying a conversion to the entity set of data; converting the entity set of data to the standard record format based on the conversion to form a converted set of data; passing the converted set of data to the main processing engine; in the main processing engine receiving the standard record format entity set of data and the converted set of data; and producing a set of results combining the converted set of data and the standard record format data for selection by a user of a preferred entity.

19 Claims, 9 Drawing Sheets

U.S. PATENT DOCUMENTS

| | | | |
|---|---|---|---|
| 8,131,574 B2 * | 3/2012 | Dourthe et al. | 705/5 |
| 2002/0143587 A1 | 10/2002 | Champernowne | |
| 2004/0260581 A1 | 12/2004 | Baranowski et al. | |
| 2005/0288974 A1 | 12/2005 | Baranowski et al. | |
| 2006/0059038 A1 * | 3/2006 | Iuchi et al. | 705/14 |
| 2007/0073563 A1 * | 3/2007 | Dourthe et al. | 705/5 |

OTHER PUBLICATIONS

"Statement in accordance with the Notice from the European Patent Office dated Oct. 1, 2007 concerning business methods," Official Journal EPO, pp. 592-593 (Nov. 2007).

* cited by examiner

| Depart | Arrive | Dept Time | Arrival Time | Airline | Flight | Ticket Price | Total Price |
|---|---|---|---|---|---|---|---|
| NCE | LON | 08:15 | 10:25 | TLA1 | LCC1 1000 | €78 | €160 |
| LON | NCE | 10:20 | 12:30 | TLA2 | LCC2 500 | €82 | |
| NCE | PAR | 07:40 | 08:50 | FSC | FSC 300 | €98 | €180 |
| PAR | LON | 10:00 | 11:15 | FSC | FSC 400 | | |
| NCE | LON | 10:20 | 12:30 | TLA2 | LCC2 500 | €82 | |
| NCE | LON | 08:15 | 10:25 | TLA1 | LCC1 1000 | €78 | €190 |
| LON | NCE | 11:10 | 13:20 | FSC | FSC 200 | €112 | |
| NCE | PAR | 07:40 | 08:50 | FSC | FSC 300 | | €210 |
| PAR | LON | 10:00 | 11:15 | FSC | FSC 400 | | |
| LON | PAR | 10:20 | 12:30 | FSC | FSC 50 | | |
| PAR | NCE | 13:40 | 14:50 | FSC | FSC 75 | | |
| NCE | PAR | 06:40 | 07:50 | FSC | FSC 300 | | €230 |
| PAR | LON | 10:10 | 11:25 | TLA1 | FSC 400 | €110 €120 | |
| LON | PAR | 10:30 | 12:40 | TLA1 | FSC 50 | | |
| PAR | NCE | 14:40 | 15:50 | FSC | FSC 75 | | |

Fig. 9

SEARCH ENGINE AND ASSOCIATED METHOD

PRIORITY CLAIM

This application claims the benefit of European patent application no. EP 10305016.7 filed Jan. 6, 2010.

FIELD OF THE INVENTION

The present invention relates to a method and system for providing an improved search engine, particularly but not exclusively for enabling the processing of travel fares in a generic manner from a variety of sources on a Global Distribution System (GDS).

BACKGROUND OF THE INVENTION

A global distribution system (GDS) is the de facto standard in the airline industry and publishes fares through a variety of different bodies, such as an airline tariff publishing company (ATPCo), SITA, official airline guides (OAG) or appropriate lookalikes. The "standard carrier" is a carrier that publishes its fares to any of the above-mentioned bodies and is linked into the GDS. Amongst these carriers there are full service carriers (FSC) and also airlines categorized as low-cost carriers (LCC).

Ticketless access (TLA) carriers work in a different way, as they do not publish fares but instead price journeys themselves and manage the whole chain from fare quotation to passenger name record (PNR) management. Typically these types of carriers do not produce a paper ticket.

The travel and leisure market has changed significantly in recent times as new providers of content have emerged, mostly through the Internet. This has resulted in a large diversity of methods and tools. In addition, the new content is often not available through any medium other than that designed by the provider of that content, particularly where that provider is relatively new in the marketplace. As a result, end users wishing to find the cheapest air fares must visit a rapidly increasing number of different websites. There is still no guarantee however that this will result in actually finding the most cost-effective solutions fora number of different reasons. Firstly, there is an irreconcilable difference between inputs expected by each provider which makes it difficult for the user to select the best search criteria. In addition, the high variability of business models limits the capability to accurately compare equivalent offers. Finally, meta-searches have significant limitations and often do not provide the full chain of travel for a particular journey or product and do not have access to all the content providers.

FIG. 1 is a diagram of the current state of the art and demonstrates a typical case when an end-user is searching for a travel or leisure solution from several providers. Here the end-user is searching websites for TLA carriers 103, meta-search websites 102, on-line travel agency (OLTA) websites 100, and airline websites 101 via a FSC website. The OLTA and standard carriers are based on a GDS product (104 and 105). The meta-search websites are based on parsing OLTA 106 and airline 107 websites as well as on GDS products 108. In addition the search websites or the OLTA may have some links to certain TLA websites (109, 110 and 111). This may be achieved by parsing or using a direct link. The GDS is typically connected to a centralized provider (112) such as an ATPCo or an OAG. The TLA websites access content provider from respective TLA providers (113).

The FIG. 2 shows a state-of-the-art dataflow demonstrating the different data routes depending on the type of carrier. For a TLA carrier 20 the data passes from a TLA user interface to a TLA data manager 200, TLA solutions 202 and a solutions aggregator 204 in a Low Fare Search (LFS) engine 206. The data from the standard carriers, for example via the FSC or a pioneer carrier (standard carrier 22), passes to a fare and rules databases 208, 210 on the one hand. Whilst on the other hand the flight and availability date passes to flight and availability databases 212, 214. Subsequently, data from the rules and fare databases and the flights and availability databases pass to the universal faring engine 216 and then onto a subsequent FSC and a pioneer solutions database 218 before arriving at a solutions aggregator 204. The format of each different dataflow leads to the creation of a separate recommendation for the TLA carriers and the standard carriers. This is not ideal.

Indeed the prior art leads to certain drawbacks for both the travel vendor and the end-user. In particular the travel vendor has to maintain a number of parallel methods to obtain or book recommendations from different providers. Similarly since there is no vendor capable of offering information relating to all providers, the end-user has to conduct a number of different searches to attempt to compare and contrast differently presented solutions.

OBJECTS OF THE INVENTION

It is an object of the present invention to overcome at least some of the problems associated with the prior art.

It is a further object of the present invention to provide method and system capable of transforming and formatting data from multiple sources and of multiple natures into one comprehensive data format within, for example, the airline industry.

SUMMARY OF THE INVENTION

The present invention provides a method and system as set out in the accompanying claims.

According to one aspect of the present invention there is provided a method of searching for a entity amongst a plurality of entities, wherein all the entities are linked by at least one criterion in common and have a plurality of data formats, wherein each entity comprises a set of data which can be searched by means of criteria entered by a user; and wherein each entity has a data format; and further wherein a specific one of the data formats defines a standard record format; the method comprising the steps of: determining the data format of an entity; if the data format of the entity does not match the standard record format, passing the entity to a pre-processing engine; if the data format of the entity does match the standard record format, passing standard record format data of the entity to a main processing engine; in the pre-processing engine comparing the entity data format to the standard record format and applying a conversion to the entity set of data; converting the entity set of data to the standard record format based on the conversion to form a converted set of data; passing the converted set of data to the main processing engine; in the main processing engine receiving the standard record format entity set of data and the converted set of data; and producing a set of results combining the converted set of data and the standard record format data for selection by a user of a preferred entity.

The present invention provides a generic fare search engine for the airline industry; for example, thereby reducing costs and infrastructure. The quality of searches for TLA carriers is greatly enhanced since the search engine benefits from fare search options and from improvements on a single generic engine. The present invention allows recommendations that include a mix of standard carriers and TLA carriers being booked and paid for at the same time. By virtue of the improved engine full integration of TLA and standard carriers is thus achieved.

The present invention provides an end-user with travel fares from any travel provider irrespective of the data format and searching method used. This will increase the quality of offers provided to the user. The offers provided will be based on the end-user requests, up-to-date, accurate and readily bookable. In addition, the user interface is comprehensive and user-friendly.

The present invention allows transparent and complete integration of existing standard and nonstandard market sectors in the airline industry. This invention leads to the creation of a mixed engine able to treat simultaneously TLA carriers and standard carriers' requests and output a mixed solution within the same timescale and quality as existing search engines. In addition, the business application processing of standard carriers will be able to process TLA carriers with minimal change.

In summary, the present invention solves at least two major problems. The first is to reduce data format multiplicity by enabling integration of standard carrier processes and TLA carrier processes to thereby generate a market open standard that can interact with proprietary standards. A further problem solved is that of the difference in pricing logic can be accommodated and be presented to the user in a manner that allows comparison.

The subject matter described herein may be implemented using a non-transitory computer readable medium, having stored thereon executable instructions for controlling the processor of a computer to perform steps described herein relating to a search engine and the associated method. Exemplary computer readable media suitable for implementing the subject matter described herein include chip memory devices, disk memory devices, programmable logic devices, and application specific integrated circuits. In addition, a computer readable medium for implementing the subject matter described herein may be located on a single device or computing platform or may be distributed across plural devices or computing platforms.

BRIEF DESCRIPTION OF THE DRAWINGS

Reference will now be made, by way of example, to the accompanying drawings, in which:

FIG. 9 is a possible screenshot of the results of a particular business application, in accordance with an embodiment of the invention.

DETAILED DESCRIPTION OF THE PREFERRED EMBODIMENTS

Figure 3:
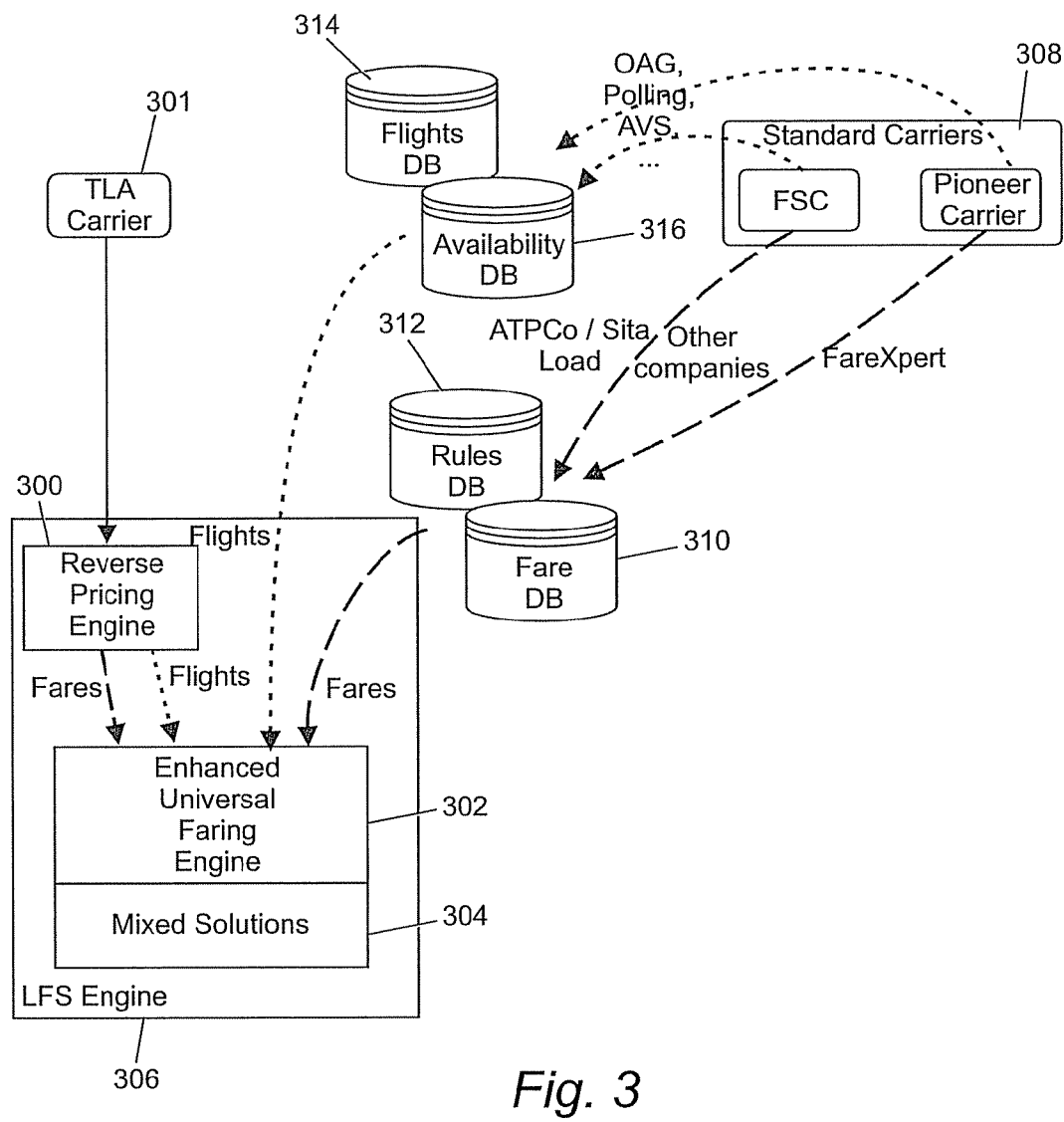
FIG. 3 is a diagram of a dataflow, in accordance with an embodiment of the invention.

Referring to FIG. 3, a modified dataflow is presented in accordance with the invention. A component or module called the reverse pricing engine 300 is introduced into the flow of TLA data. The reverse pricing engine 300 receives an input of TLA data from the TLA carrier 301 and eventually converts the data to standard data (i.e. data formatted using the de facto standard for travel information which will be described in greater detail below). The TLA data has a specific data format that may change from time to time. The input from the TLA is dynamically updated and is not stored as such in the reverse price engine, although data is always available. In addition, the universal faring engine 302 is enhanced to be able to take into account specific constraints and rules from the TLA carrier. The universal faring engine is thus capable of creating both TLA and standard carrier recommendations and combining them so that a mixed recommendation 304 can be produced. The reverse pricing engine 300, the enhanced universal faring engine 302, and a mixed recommendation 304 are located in an LFS engine 306.

The data from the standard carriers, for example via the FSC or a pioneer carrier (standard carrier 308), passes to a fare and rules databases 310, 312 on the one hand. Whilst on the other hand the flight and availability date flows to flight and availability databases 314, 316. The data passing to the fare and rules data are typically updated asynchronously five to ten times a day. Subsequently, data from the rules and fare databases and the flights and availability databases pass to the enhanced universal faring engine 302 and then into a mixed recommendation 304.

Figure 4:
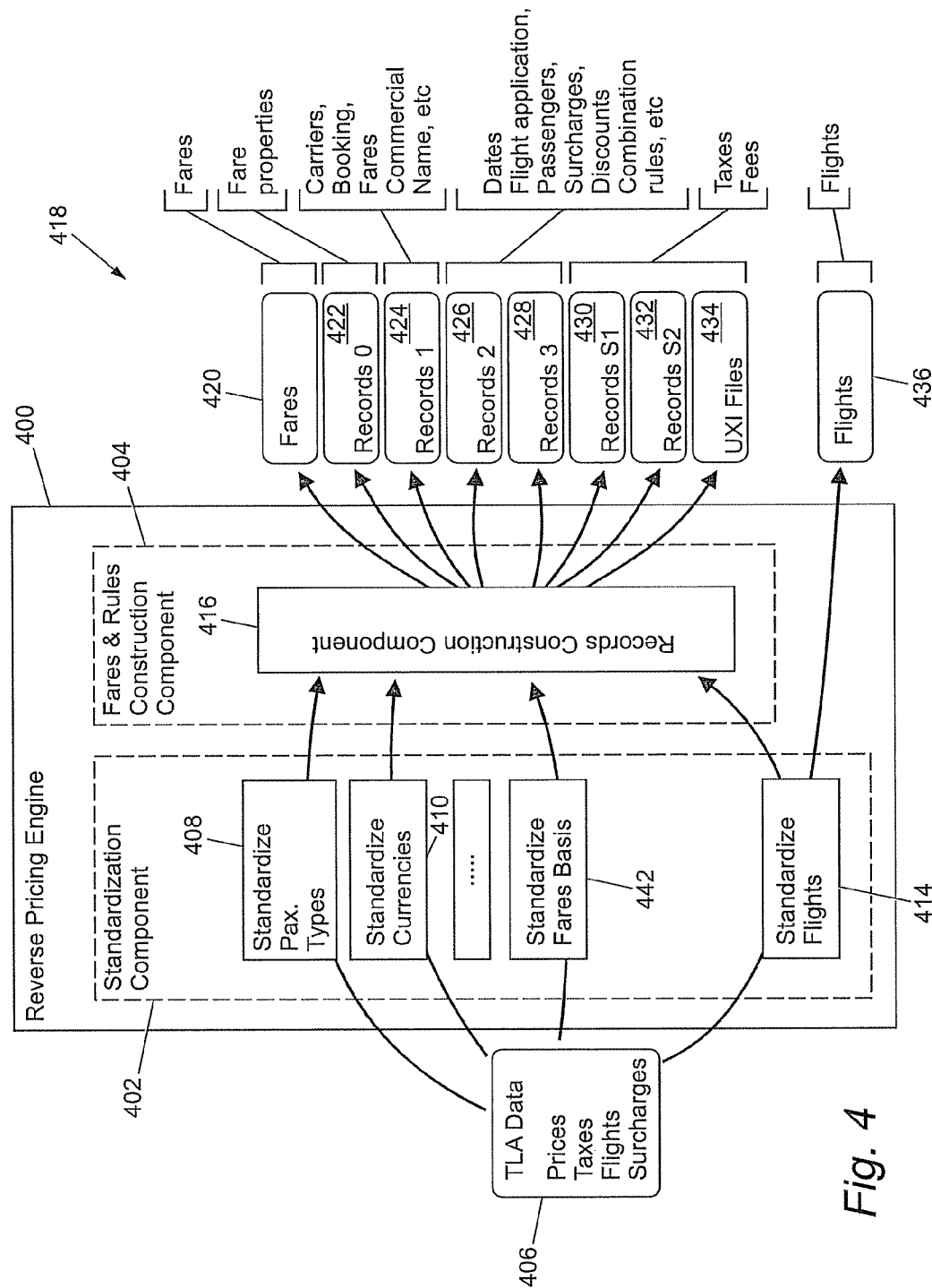
FIG. 4 is a diagram of a reverse pricing engine, in accordance with an embodiment of the invention.

The reverse pricing engine will now be described in great detail with reference to FIG. 4. The reverse pricing engine 400 includes standardisation components or modules 402 and fare and rules construction components or modules 404. TLA data 406 is received at the standardisation components and then passed through to the fare and rules construction components. The TLA data includes at least prices, taxes and flight information. The standardisation component analyses the data received from the TLA carrier. This received data can then be formatted using proprietary values (e.g. unnamed passenger type) or may not fit the expected format (e.g. no fare basis, currency different from requested currency etc.). The standardisation component may include a catalogue of values including at least a standardisation passenger (PAX) type 408, a standardisation currency block 410, a standardisation fare basis block 412, and a standardised flight block 414. Further blocks or modules may be included as required in order to enable TLA data to be standardised to that dictated by the de facto standard.

The fare and rules construction component includes a records construction component or module 416 which converts or maps the standardised elements into predetermined records shown generally at 418. These records 418 are a de facto standard of fare categories in the airline industry. The input data will at anytime map onto the records in a predetermined way. This mapping or conversion is stored in the fare and rules construction component. If the data format of the TLA data changes, the mapping or conversion rules will also change and be updated. The records 418 produced will depend upon the input data and required standardisation. Based on the de facto standard the present example shows the output from the records construction component to be fares 420, records 0, 1, 2 and 3 (422, 424, 426, 428 respectively); records S1 and S2 (430, 432 respectively); and UIX files 434. In addition, flights 436 are output based on the standardisation of flights in the standardised flight block 414. Each of the outputs is associated with the predetermined parameter. The predetermined parameters include the following: fares; fare properties; carriers; bookings; fare names; date; flight application; passengers; surcharges; discounts, comment; combinations; rules; taxes; fees; flight; and any other appropriate parameter. The predetermined parameters are also defined as part of the de facto standard and are each linked with one of the records.

It should be noted that the records exhibit a property that makes them versatile, this property is known as "stringing". A string is made of several records which may be of different natures. Each string points to another such that the validation of the first is made through the validation of the other. Alternatively, the strings may qualify one another such that the validation of the first record is a pre-requisite of the validation of the next. In a preferred embodiment stringing will be used to build records that reconcile the large amount of TLA data received as the input with the de facto standard parameters.

Figure 1:
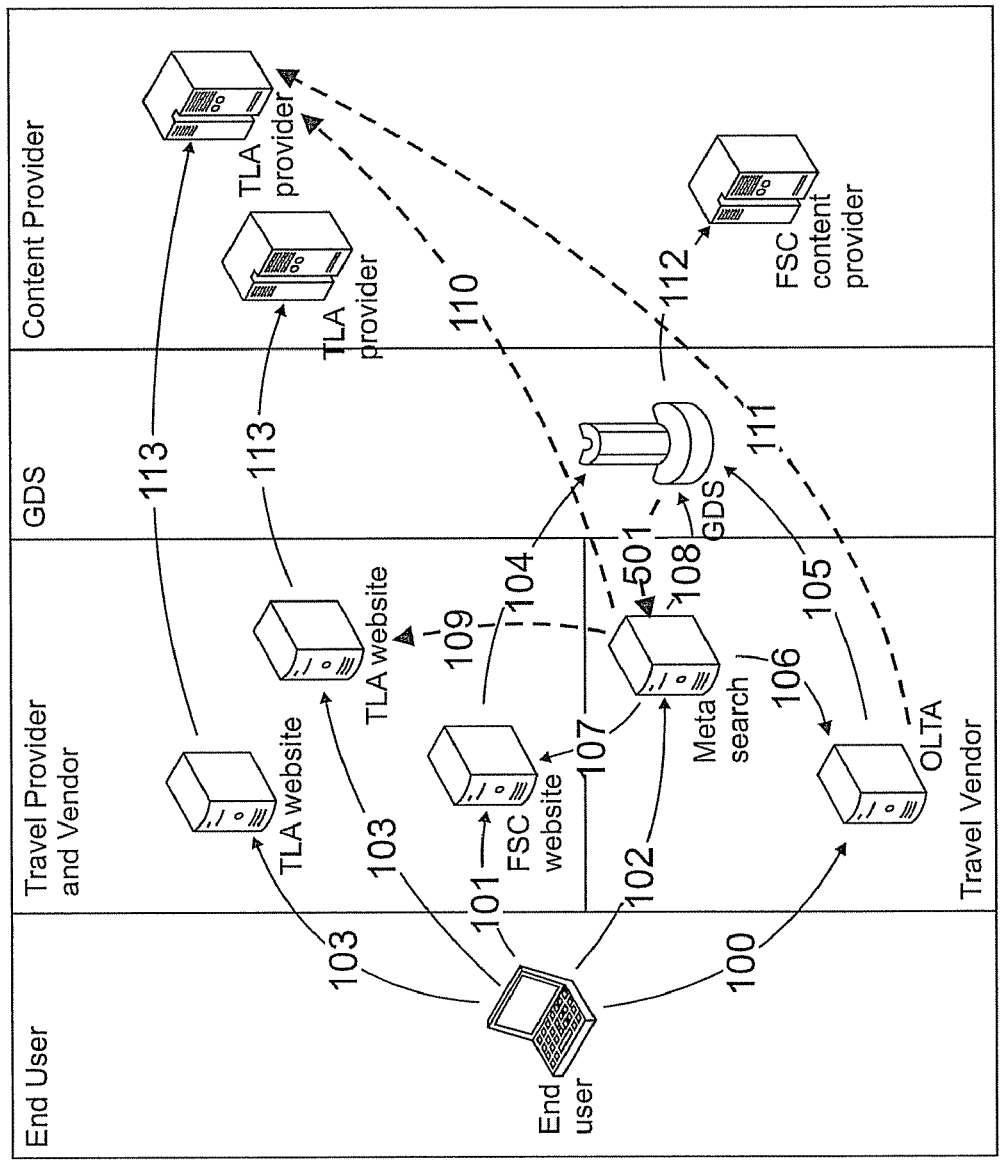
FIG. 1 is a diagram of the state of the art configuration for searching for an airline tickets, in accordance with the prior art.
Figure 2:
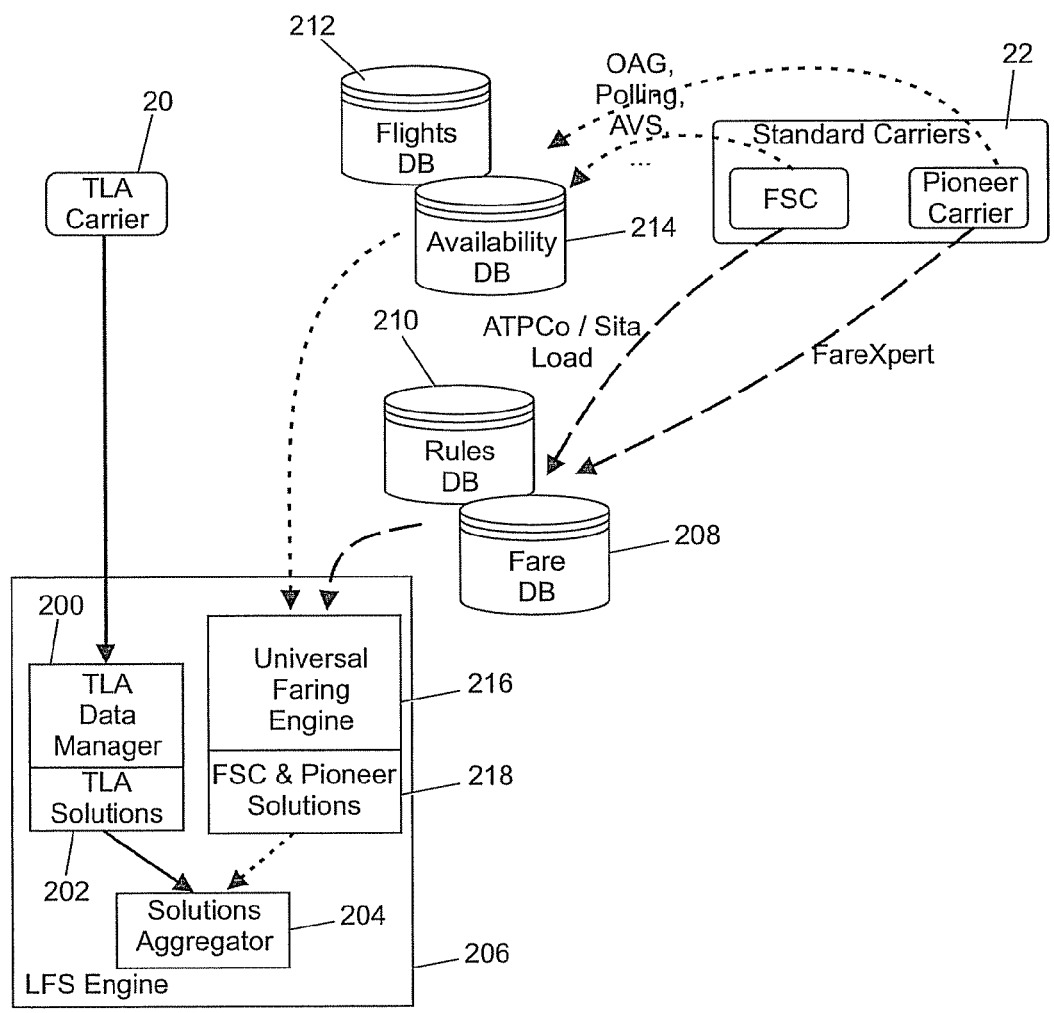
FIG. 2 is a diagram of the state of the art dataflow, in accordance with the prior art.
Figure 5:
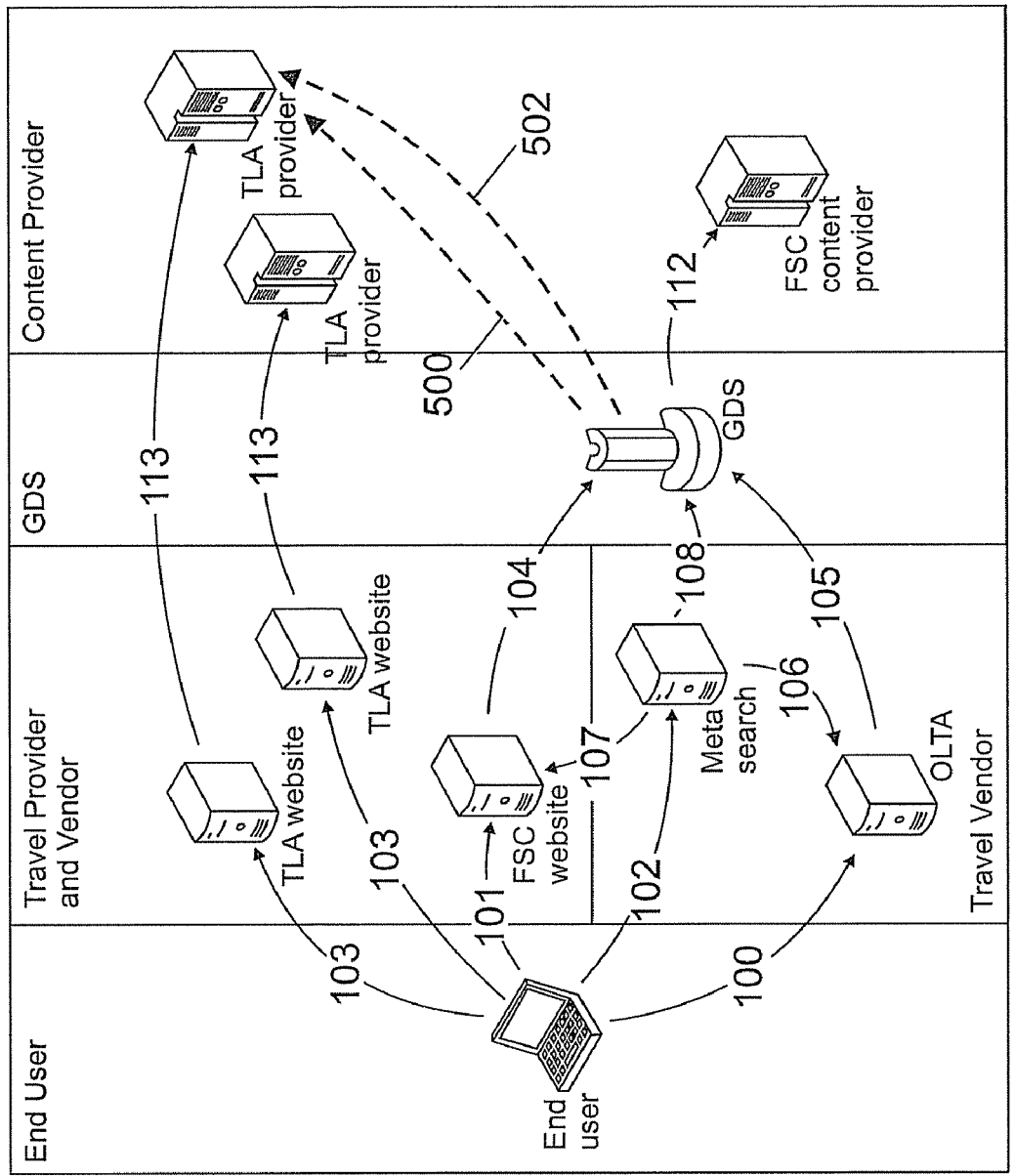
FIG. 5 is a diagram of the end-to-end system, in accordance with an embodiment of the invention.

FIG. 5 is an equivalent diagram to FIG. 1 in which the invention as implemented is shown. It can clearly be seen that the amount of traffic is significantly reduced by implementing the invention. In addition, the GDS becomes a central component in each and every communication ensuring the data relating to any flights can be accessed thereby. Details of the various communications are not described in detail although the reference numbers are equivalent to those in FIG. 1 where appropriate. It can be seen that communication from the OLTA and meta search to the TLA website and TLA provider in FIG. 1 are avoided. Instead communications 500 and 502 from the GDS to the TLA provider replace these.

Figure 6:
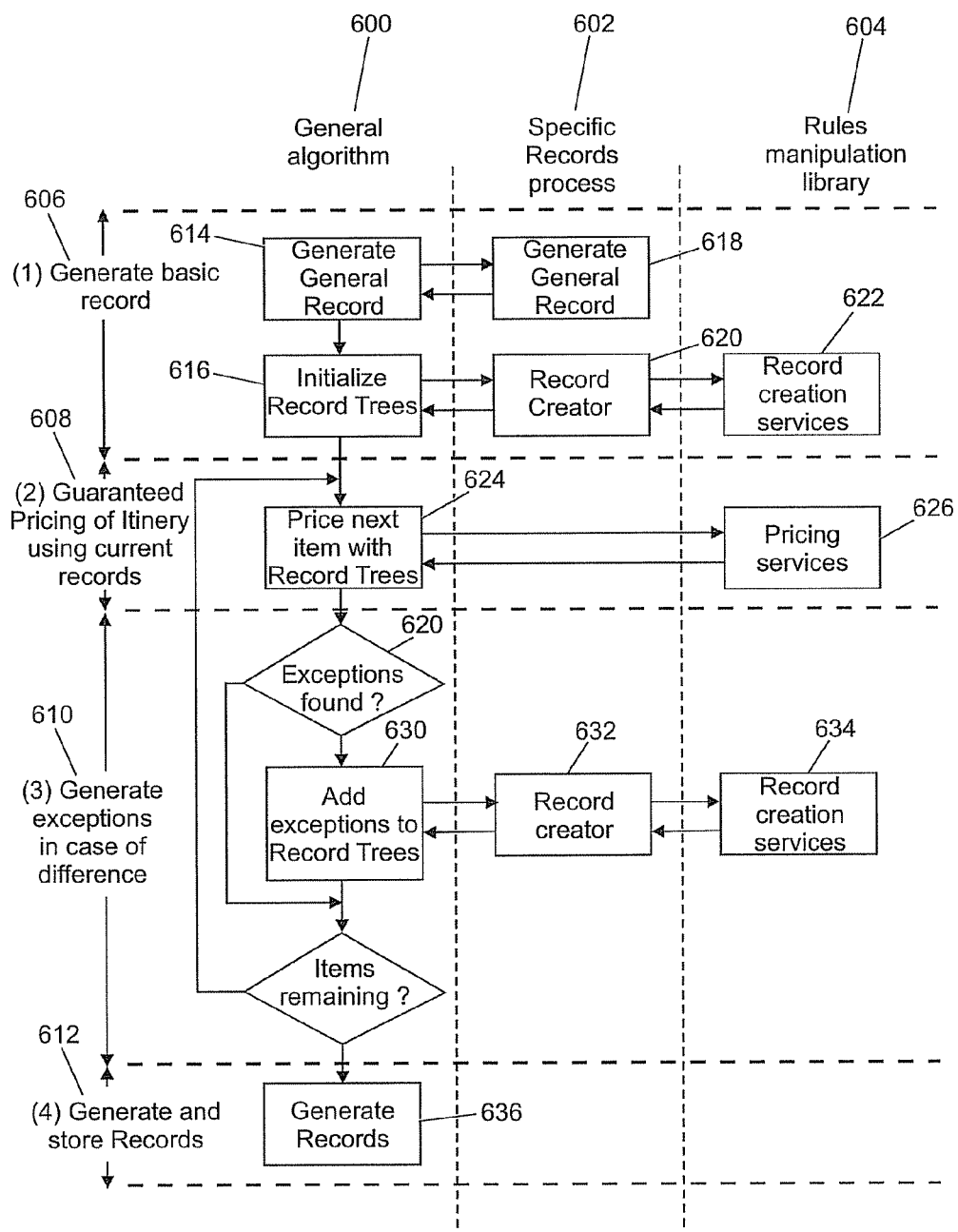
FIG. 6 is a block diagram showing the construction components of an algorithm, in accordance with an embodiment of the invention.

FIG. 6 shows a flow diagram of the algorithm developed to build records from the standardised "plain" data. There are three main layers required in order to build the appropriate records. These three layers included the general algorithm 600, specific records processes 602 and a rules manipulation library 604. The general algorithm layer contains the logic of the algorithm itself. The record specific layer contains logic specific to particular records. The record manipulation library contains all routines useful in manipulating the records.

Each of the layers can further be split into four main stages some of which occur in all layers and some of which occur in only certain layers. The four main stages include generate basic record 606; guaranteed pricing 608; exceptions treatment 610; and generation and storage of the final records 612.

The generation of the basic record is a fundamental stage and the form the record takes impacts the convergence of the algorithm and the quality of the final resultant record. The basic record is an initial simple record which can then be the basis of the final record. The formation of the basic record is generally carried out by extracting the most representative data from the input standardised TLA data. This is accomplished by means of knowing the format of the TLA data at any given time. With this knowledge, it is possible to convert fields such as price, cost, taxes etc into equivalent records. Once the basic record is determined the next stages are carried out. All data entries are considered in sequence to ensure that the TLA data is converted into appropriate records. The stage of generating the basic record includes a generate general record step 614 and an initialised record tree step 616 in terms of the general algorithm. In terms of the specific records processes layer this includes a generate general record step 618 and a record creator step 620. The rules manipulation library layer can then interact with the initialised record tree step 616 and the record creator step 620 to provide a record creation service 622.

TABLE 1

| # | Cities | Flights | Passengers | Surcharge |
|---|--------|---------|------------|-----------|
| 1 | NCE-LON | 0098 | ADT | 120 |
|   |         |      | CHD | 120 |
|   |         |      | INF | 120 |
| 2 | NCE-LON | 0100 | ADT | 100 |
|   |         |      | CHD | 70 |
|   |         |      | INF | 100 |
| 3 | NCE-PAR | 0055 | ADT | 150 |
|   | PAR-LON | 0075 | CHD | 75 |
|   |         |      | INF | 50 |

Table 1 shows three record entries relating to specific flights from the same departure point and the same arrival point. A flight number is then included along with an identification of surcharge for different types of passengers. The records include other data, such as the fare, booking codes, carriers, etc, but for clarity purposes these are not displayed. Nice to London are the two common criteria for all data and are generally entered by the user at the start of the search. Accordingly, each set of data will have the criteria in common.

An example of the result of this generation of the basic record stage can be done with table 1. The simplest case is record #1, in which all surcharges are €120, regardless of passenger. In other words a surcharge for a flight from Nice to London will be nominally priced at €120.

The next stage of the process is a guaranteed pricing stage. This stage produces a complete and standard pricing of the currently selected TLA data entry. This is accomplished by using a guaranteed pricing engine which analyses the records but then ignores the known components. In the pricing engine there are fields which contain parameters or results. The pricing engine will ignore its own results and will calculate results from other parameters. The pricing engine will then check the results that are calculated and stored. Each record item in the record tree is priced in step 624 by accessing pricing services 626 in the rules manipulation library.

It can clearly be seen that records #2 and #3 are not the same as record #1 and constitute so-called exceptions. The next phase of the algorithm then goes on to generate exceptions in case of difference as will be described below. As previously identified €120 is selected as the base result or basic record for surcharges between Nice and London, since this is the simplest case (surcharges for all passenger types are the same). Other records show different surcharges overall and also vary for different passengers and are then treated as exceptions. With reference to FIG. 6 the exception is identified in step 628 and then analysed as follows before being added to the exception to records tree 630.

Figure 7:
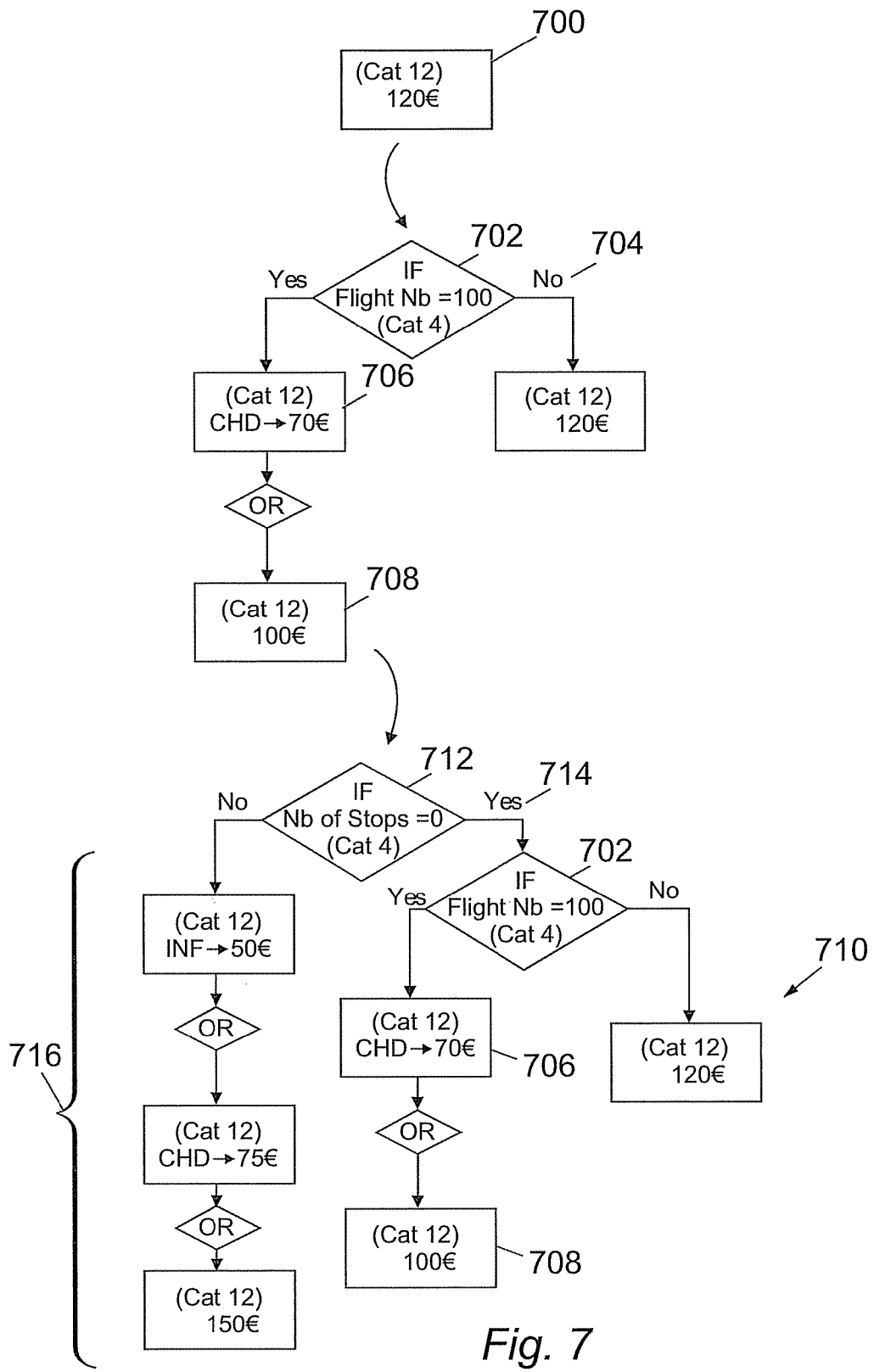
FIG. 7 is an example of the process of a reverse pricing engine, in accordance with an embodiment of the invention.

The analysis for calculating the exceptions within the reverse pricing engine is described with reference to FIG. 7. FIG. 7 relates to record 3 (428) in FIG. 4 which deals with surcharges. Initially a basic record 700 of €120 is selected for comparison with a pricing itinerary. Comparing pricing itinerary #1 identifies a surcharge of €120 for all passengers. Thus pricing itinerary #1 matches the basic record. Looking next at pricing itinerary #2 this relates to flight number 0100 702. Based on this flight number a comparison is made with the basic record 700 and no match is made. As a result, an exception is created: this exception 706 in FIG. 7 shows that for flight 0100 child surcharges are €70 706 and other surcharges are €100 708. This exception line (706, 708) is stored in the records based on the flight number. Referring to FIG. 6, this takes place by means of record creator 632 and record creation service 634. For pricing itinerary #2 in respect of surcharges the unique identifier is selected as the flight number 0100. This identifier linked with surcharges cannot be used for any other pricing itinerary in order to form an exception, as there would be no way of differentiating exceptions if there were not a unique identifier. The unique identifier is selected in each case based on the situation and the circumstances of the records.

With reference to pricing itinerary #3 a different unique identifier must be identified. Pricing itinerary #3 relates to a trip which makes a stop. Pricing itinerary #1 and pricing itinerary #2 both have no stops. Accordingly, the process of comparing pricing itineraries with a basic record can be carried out as shown generally at 710 in FIG. 7. The first question 712 is to determine the number of stops for a flight. If number of stops equals zero 714 step 702 is repeated to determine whether the pricing itinerary matches the base record 700 or the exception line 706, 708. If the number of stops is greater than zero a new exception 716 is created. The new exception represents pricing itinerary #3 and relates to a greater number of stops than zero with an infant surcharge of €50, a child surcharge of €75 and an adult surcharge of €150. This new exception 716 can also be stored in the exceptions part of the database.

Once all the pricing itineraries in a given set have been completed the final record is generated as shown in FIG. 6, 636. In this case the given set is surcharges between Nice and London. It will be appreciated that producing exceptions will be carried out in respect of all sets of data relating to the de facto standard for categories 418 in FIG. 4. Surcharges is part of record 3, along with discounts, combination rules etc. Record 2 relates to date, flight application, passengers, etc. The final result of the processing will be a base record for each de facto standard fare category along with a set of exceptions based on the TLA data that does not match the base record for that particular de facto standard fare category. This is dynamically updated as new TLA data is received and stored as standard records for each element of data in the TLA data. A set of results is built for a particular trip or flight such that the results include all the different price options available for the particular trip or flight. The standard record contains all TLA data for a particular enquiry.

The standard records representing TLA data are still not suitable for injection into existing faring engines, as they would not give correct results. This is due to the fact that traditional standard carrier engines produce one ticket per recommendation even if that recommendation relates to more than one airline. As there is no agreement between the TLA carriers and the standard carriers for interlining, a recommendation mixing TLA carriers and standard carriers on a single ticket would not be feasible. Multi ticket standard carrier engines produce several tickets for one recommendation looking for a best combination in terms of pricing. Mixing TLA carriers and the standard carriers on such an engine would not produce the required partitioning of tickets due to the specific logic required for each carrier. This again would not be feasible.

Figure 8:
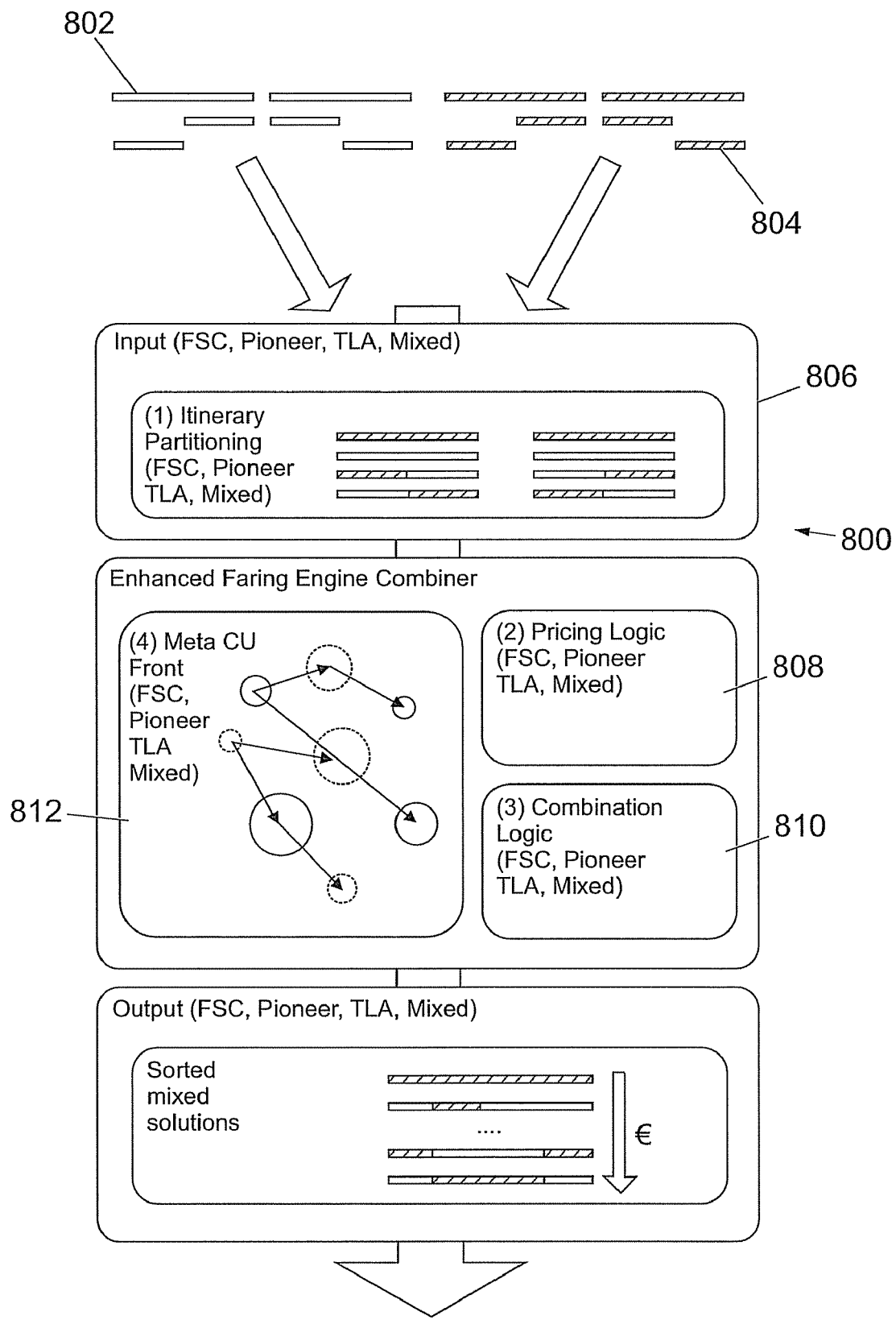
FIG. 8 is a block diagram of an enhanced faring engine, in accordance with an embodiment of the invention.

The present invention addresses this problem by use of an enhanced faring engine 800 which will now be described in greater detail with reference to FIG. 8. Enhanced faring engine 800 makes changes to the traditional standard carrier faring engine to produce a faring engine able to mix the TLA carriers and standard carriers within one single recommendation. The enhanced faring engine receives information relating to TLA flights 802 and standard carrier flights 804. A module referred to as an itinerary partitioning module 806 combines the standard carriers and TLA carrier flights propositions that cover a requested itinerary. The itinerary is split into components, each being specific to a type of carrier. The pricing of each component is then determined so that the split and the pricing of each part can be seen separately. A mixed pricing logic module 808 create price core units (PU) are both standard carriers and TLA carriers by applying construction rules that are specific to each. A mixed combination logic module 810 organises the price of the units into a complete unit, which covers the complete itinerary for both the TLA carriers and standard carriers. This is accomplished by a combination of specific rules. A complete coverage for a particular itinerary is referred to as a "Meta CU". An algorithm referred to as the Meta CU Front 812 analyses all the created Meta CU data and keeps the best ones to create a mixed recommendation. Recommendations that are unreasonable (for example, too many legs, too expensive, too slow etc) are discarded first. Then when a predetermined number of recommendations is reached these are displayed. As the process progresses the next result is selected based on the previous result to determine the best price available for each part or component of the particular trip.

The Meta CU algorithm is critical to reduce the amount of processing that would normally be required in order to create a mixed recommendation. For example taking a journey made of three segments and considering the pricing options of three TLA carriers and all the standard carriers (all the standard carriers account as one set of data due to the fact that the standard carrier information is all in the appropriate format) and there are essentially four carriers each with three different segments.

Mathematically this equates to $4^3=64$. This means there are 64 possible combinations from which the best recommendations need to be identified. The Meta CU algorithm reduces the number of recommendations until they reach a certain or predetermined value. Once the best recommendations have been identified and combined they are output 814. The output 814 from the enhanced their engine for a journey from Nice to London and then London to Nice could be as shown in FIG. 9.

FIG. 9 shows a selection of different recommendations of flights from Nice to London and return flights from London to Nice. The table includes departure and arrival location along with departure and arrival times. In addition the airline has identified along with the flight number. Finally the ticket price is identified along with a total price for the return journey. Entry 900 proposes an outward flights using TLA1 and an inbound flight using TLA2. The total cost is determined to be €160. Entry 902 proposes an outward flight of two legs using an FSC and return flights also the two legs using the same FSC. In this case the total price is the same as the ticket price.

A person skilled in the art will understand that some or all of the functional entities as well as the processes themselves may be embodied in software, or one or more software-enabled modules and/or devices or in any combination thereof.

This invention has been described with reference to the purchase of tickets in the travel environment. However, it will be appreciated that the invention may apply to other environments, for example comparing prices for other goods and services. The various goods, services, products, etc. may be referred to as an entity. A user may wish to search for an entity matching certain criteria (e.g. data stored in the records). In the example described above, the entity is a flight ticket; the criteria are the start and finish locations and the results of the search are possible flights available for the given criteria including details thereof such as price, numbers of stops, and any other appropriate information.

It will be appreciated that this invention may be varied in many different ways and still remain within the intended scope of the invention.

What is claimed is:

1. A method of pricing at least one itinerary, the method comprising:
receiving data in a first format representing one or more flights of a ticketless access carrier into a reverse pricing engine of a global distribution system;
in the reverse pricing engine, standardizing the data from the ticketless access carrier from the first format to a first set of data having a second format and including a first pricing element for each flight of the first carrier;
communicating the first set of data to an enhanced universal faring engine;
receiving into the enhanced universal faring engine a second set of data in the second format representing one or more flights of a standard carrier and including a second pricing element for each flight of the standard carrier; and combining the first and second sets of data of the second format in a mixed solutions engine to establish a third pricing element for the at least one itinerary comprised of a mixed recommendation including the first pricing element of at least one of the flights from the ticketless access carrier and the second pricing element of at least one of the flights from the standard carrier.

2. The method of claim 1, wherein standardizing the data from the ticketless access carrier from the first format to the first set of data having the second format and including the first pricing element for each flight of the ticketless access carrier comprises:
mapping the first set of data of each flight of the ticketless access carrier into a plurality of predetermined records, wherein one of the predetermined records includes the first pricing element for each flight of the ticketless access carrier.

3. The method of claim 2, wherein mapping the first set of data of each flight of the ticketless access carrier into the plurality of predetermined records comprises:
extracting a fourth pricing element from the first set of data that occurs with the highest frequency among the flights of the ticketless access carrier; and
assigning the fourth pricing element as a basic record.

4. The method of claim 3, wherein mapping the first set of data of each flight of the ticketless access carrier into the plurality of predetermined records further comprises:
comparing a value of the first pricing element for a first flight with the fourth pricing element of the basic record.

5. The method of claim 4, wherein mapping the first set of data of each flight of the ticketless access carrier into the plurality of predetermined records further comprises:
if the first pricing element matches the fourth pricing element, using the basic record for the first flight.

6. The method of claim 4, wherein mapping the first set of data of each flight of the ticketless access carrier into a plurality of predetermined records further comprises:
if the first pricing element does not match the fourth pricing element, creating an exception record for the first flight.

7. The method of claim 1 wherein the first, second, and third pricing elements are fares, surcharges, taxes, or fees.

8. An apparatus comprising:
a processor; and
a reverse pricing engine configured be executed by the processor, the reverse pricing engine including a standardization module that receives data in a first format representing one or more flights of a ticketless access carrier and that standardizes the data from the ticketless access carrier from the first format to a first set of data having a second format and including a first pricing element for each flight of the ticketless access carrier;
an enhanced universal faring engine configured be executed by the processor to receive a second set of data in the second format representing one or more flights of a standard carrier and including a second pricing element for each flight of the standard carrier; and
a mixed solutions engine configured be executed by the processor to combine the first and second sets of data of the second format to establish a third pricing element for the at least one itinerary comprised of a mixed recommendation including the first pricing element of at least one of the flights from the ticketless access carrier and the second pricing element of at least one of the flights from the standard carrier.

9. The apparatus of claim 8, wherein the standardization module of the reverse pricing engine is configured to standardize the data from the ticketless access carrier from the first format to the first set of data having the second format by:
mapping the first set of data of each flight of the ticketless access carrier into a plurality of predetermined records, wherein one of the predetermined records includes the first pricing element for each flight of the ticketless access carrier.

10. The apparatus of claim 9, wherein the standardization module of the reverse pricing engine is configured to map the first set of data of each flight of the ticketless access carrier into the plurality of predetermined records by:
extracting a fourth pricing element from the first set of data that occurs with the highest frequency among the flights of the ticketless access carrier; and
assigning the fourth pricing element as a basic record.

11. The apparatus of claim 10, wherein the standardization module of the reverse pricing engine is further configured to map the first set of data of each flight of the ticketless access carrier into the plurality of predetermined records by:
comparing a value of the first pricing element for a first flight with the fourth pricing element of the basic record.

12. The apparatus of claim 11, wherein the standardization module of the reverse pricing engine is further configured to map the first set of data of each flight of the ticketless access carrier into the plurality of predetermined records by:
if the first pricing element matches the fourth pricing element, using the basic record for the first flight.

13. The apparatus of claim 11, wherein the standardization module of the reverse pricing engine is further configured to map the first set of data of each flight of the ticketless access carrier into the plurality of predetermined records by:
if the first pricing element does not match the fourth pricing element, creating an exception record for the first flight.

14. A computer program product comprising:
a non-transitory computer-readable medium; and
computer executable instructions for controlling the processor of a computer to price at least one itinerary, the computer instructions comprising:
receiving data in a first format representing one or more flights of a ticketless access carrier into a reverse pricing engine of a global distribution system;

in the reverse pricing engine, standardizing the data from the ticketless access carrier from the first format to a first set of data having a second format and including a first pricing element for each flight of the first carrier;

communicating the first set of data to an enhanced universal faring engine;

receiving into the pricing enhanced universal faring engine a second set of data in the second format representing one or more flights of a standard carrier and including a second pricing element for each flight of the standard carrier; and combining the first and second sets of data of the second format in a mixed solutions engine to establish a third pricing element for the at least one itinerary comprised of a mixed recommendation including the first pricing element of at least one of the flights from the ticketless access carrier and the second pricing element of at least one of the flights from the standard carrier, wherein the program instructions are stored on the computer readable storage medium.

15. The computer program product of claim 14, wherein the computer instructions standardizing the data from the ticketless access carrier from the first format to the first set of data having the second format comprise:

mapping the first set of data of each flight of the ticketless access carrier into a plurality of predetermined records, wherein one of the predetermined records includes the first pricing element for each flight of the ticketless access carrier.

16. The computer program product of claim 15, wherein the computer instructions mapping the first set of data of each flight of the ticketless access carrier into the plurality of predetermined records comprise:

extracting a fourth pricing element from the first set of data that occurs with the highest frequency among the flights of the ticketless access carrier; and assigning the fourth pricing element as a basic record.

17. The computer program product of claim 16, wherein the computer instructions mapping the first set of data of each flight of the ticketless access carrier into the plurality of predetermined records comprise:

comparing a value of the first pricing element for a first flight with the fourth pricing element of the basic record.

18. The computer program product of claim 17, wherein the computer instructions mapping the first set of data of each flight of the ticketless access carrier into the plurality of predetermined records comprise:

if the first pricing element matches the fourth pricing element, using the basic record for the first flight.

19. The computer program product of claim 18, wherein the computer instructions mapping the first set of data of each flight of the ticketless access carrier into the plurality of predetermined records comprise:

if the first pricing element does not match the fourth pricing element, creating an exception record for the first flight.

\* \* \* \* \*

UNITED STATES PATENT AND TRADEMARK OFFICE
CERTIFICATE OF CORRECTION

| | | |
|---|---|---|
| PATENT NO. | : 8,280,870 B2 | Page 1 of 1 |
| APPLICATION NO. | : 12/713149 | |
| DATED | : October 2, 2012 | |
| INVENTOR(S) | : Pierre-Etienne Melet | |

It is certified that error appears in the above-identified patent and that said Letters Patent is hereby corrected as shown below:

In the Specification:

At column 1, line number 44, change "fora" to --for a--.

At column 7, line number 59, change "fora" to --for a--.

In the Claims:

At column 10, claim number 8, line number 3, after "configured", insert --to-- and at line number 11, after "configured", insert --to-- and at line number 16, after "configured", insert --to--.

Signed and Sealed this
Twenty-fifth Day of December, 2012

David J. Kappos
*Director of the United States Patent and Trademark Office*